United States Patent
Segev et al.

(10) Patent No.: US 10,433,109 B2
(45) Date of Patent: Oct. 1, 2019

(54) APPARATUS, SYSTEM AND METHOD OF PERFORMING A POSITION MEASUREMENT

(71) Applicant: INTEL CORPORATION, Santa Clara, CA (US)

(72) Inventors: Jonathan Segev, Tel Mond (IL); Carlos Cordeiro, Portland, OR (US); Shuki Perlman, Zur Hadassa (IL); Emily H. Qi, Gig Harbor, WA (US); Ofer Hareuveni, Haifa (IL)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/943,277

(22) Filed: Apr. 2, 2018

(65) Prior Publication Data
US 2018/0227707 A1    Aug. 9, 2018

Related U.S. Application Data

(63) Continuation of application No. 15/350,060, filed on Nov. 13, 2016, now Pat. No. 9,949,084, which is a
(Continued)

(51) Int. Cl.
*H04W 24/00* (2009.01)
*H04W 4/02* (2018.01)
(Continued)

(52) U.S. Cl.
CPC .......... *H04W 4/023* (2013.01); *H04W 4/021* (2013.01); *H04W 4/025* (2013.01); *H04W 8/005* (2013.01); *H04W 4/029* (2018.02)

(58) Field of Classification Search
CPC . H04W 8/005; H04W 4/008; H04W 56/0015; H04W 48/16; H04W 4/20;
(Continued)

(56) References Cited

U.S. PATENT DOCUMENTS 9,525,974 B2   12/2016   Segev et al.
9,949,084 B2    4/2018   Segev et al.
(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pp.
(Continued)

*Primary Examiner* — Ronald Eisner
(74) *Attorney, Agent, or Firm* — Shichrur & Co.

(57) ABSTRACT

Some demonstrative embodiments include apparatuses, systems and/or methods of performing a range measurement. For example, a first wireless communication device may include a radio to communicate a discovery frame with a second wireless communication device, the discovery frame including at least one movement indication field to indicate a time of movement of a sender of said discovery frame; and a controller to perform a range measurement procedure with said second wireless communication device.

21 Claims, 5 Drawing Sheets

Related U.S. Application Data continuation of application No. 14/493,619, filed on Sep. 23, 2014, now Pat. No. 9,525,974.

(60) Provisional application No. 62/022,347, filed on Jul. 9, 2014.

(51) Int. Cl.
*H04W 4/021* (2018.01)
*H04W 8/00* (2009.01)
*H04W 4/029* (2018.01)

(58) Field of Classification Search
CPC ..... H04W 84/20; H04W 40/24; H04W 48/18; H04W 4/021; H04W 4/025; H04W 4/08; H04W 56/001; H04W 84/18; H04W 4/023; H04W 4/029; H04L 67/16; H04L 67/04; Y02B 60/50
See application file for complete search history.

(56) References Cited

U.S. PATENT DOCUMENTS

| | | | | |
|---|---|---|---|---|
| 2007/0184864 A1* | 8/2007 | Leitch | ............... | H04W 56/0015 455/507 |
| 2009/0109923 A1* | 4/2009 | Kojima | ............... | H04W 72/044 370/331 |
| 2011/0134840 A1* | 6/2011 | Kim | ...................... | H04W 40/20 370/328 |
| 2013/0250931 A1* | 9/2013 | Abraham | ............... | H04W 8/005 370/338 |
| 2014/0302787 A1 | 10/2014 | Rantala et al. | | |
| 2014/0335885 A1* | 11/2014 | Steiner | .................. | H04W 64/00 455/456.1 |
| 2014/0355462 A1* | 12/2014 | Aldana | ..................... | G01S 5/00 370/252 |
| 2015/0026269 A1* | 1/2015 | Canton | .................. | H04L 51/04 709/206 |
| 2015/0200811 A1* | 7/2015 | Kasslin | .................. | H04L 41/12 370/254 |

OTHER PUBLICATIONS

Wi-Fi Alliance Technical Committee P2P Task Group; Wi-Fi Peer-to-Peer (P2P) Technical Specification; Version 1.2; Dec. 14, 2011; 160 pages.

Office Action for U.S. Appl. No. 14/493,619, dated Apr. 14, 2016, 32 pages.

Notice of Allowance for U.S. Appl. No. 14/493,619, dated Aug. 10, 2016, 11 pages.

Notice of Allowance for U.S. Appl. No. 15/350,060, dated Dec. 13, 2017, 26 pages.

* cited by examiner

APPARATUS, SYSTEM AND METHOD OF PERFORMING A POSITION MEASUREMENT

CROSS REFERENCE

This application is a Continuation application of U.S. patent application Ser. No. 14/493,619, filed Sep. 23, 2014, which in turn claims the benefit of and priority from U.S. Provisional Patent Application No. 62/022,347 entitled "Movement Indication NaN Proximity", filed Jul. 9, 2014, the entire disclosures of which are incorporated herein by reference.

TECHNICAL FIELD

Embodiments described herein generally relate to performing a position measurement.

BACKGROUND

Various applications use range information between devices.

The range information may enable, for example, users of the devices to meet new people and/or to use one or more services provided by the devices, e.g., when the devices are in proximity to each other. For example, a Smartphone can "unlock" a notebook, e.g., if the Smartphone is in within a predefined distance, e.g., less than one meter, from the notebook.

The range information may enable, for example, one or more advertisers of services to interact with potential clients of the services, e.g., based on the range information.

The range information may be determined using a Time-of-Flight (ToF) measurement procedure. The ToF may be defined as the overall time a signal propagates from a first station to a second station and back to the first station. A distance between the first and second stations may be calculated based on the ToF value, for example, by dividing the ToF value by two and multiplying the result by the speed of light.

Performing the ToF measurement procedure may consume a relatively large amount of power and may increase utilization of a wireless medium.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
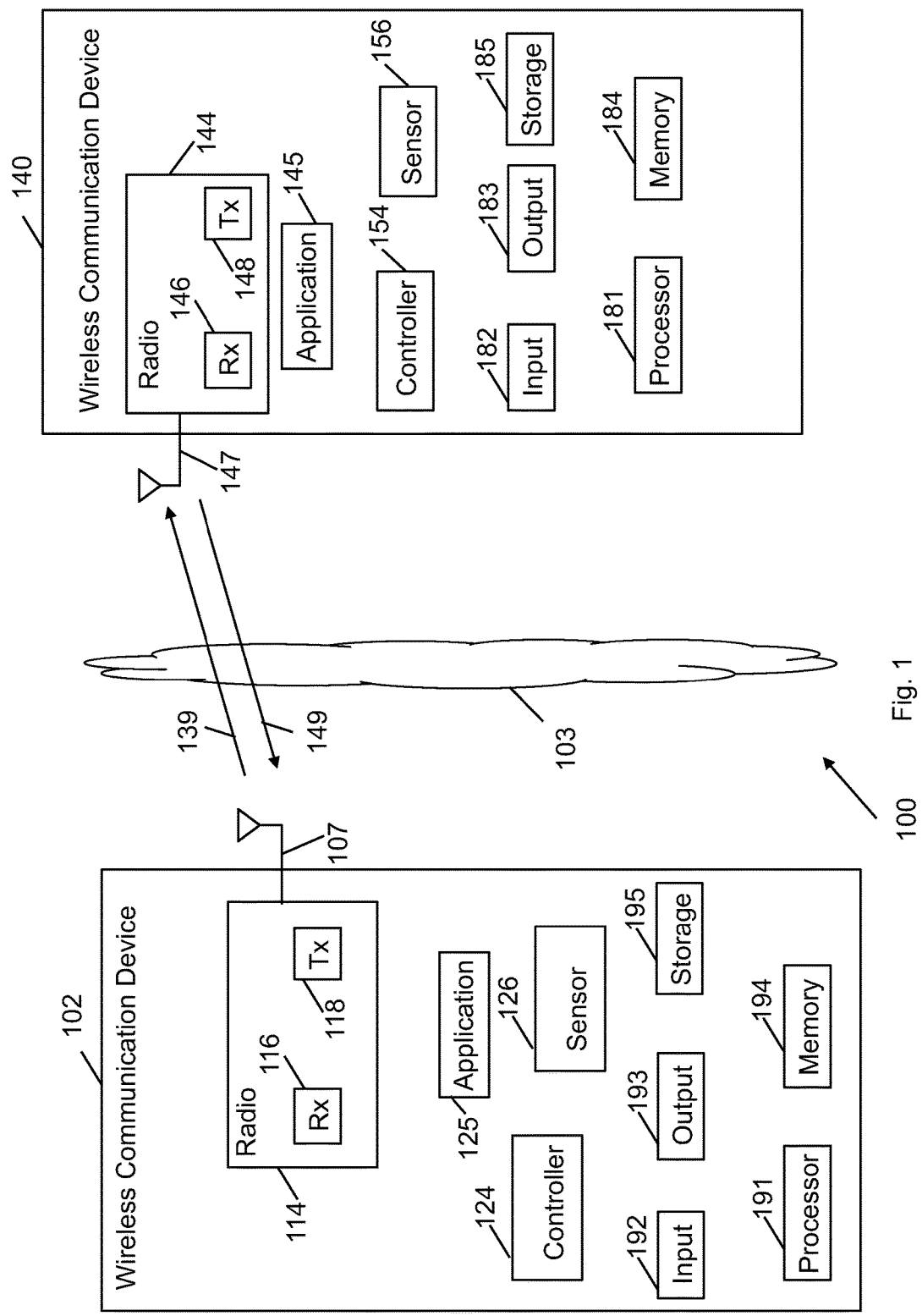
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless Fidelity (Wi-Fi) Alliance (WFA) Specifications (including the WFA Neighbor Awareness Networking (NAN) Specification, and the WFA Peer-to-Peer (P2P)

specifications (*WiFi P2P technical specification, version 1.2, 2012*)) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEEP802.11REVmc™ (IEEEP802.11REVmc™_D3.0, June 2014, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications*); *IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); *IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is at least one addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, at least one device of devices 102 and 140 may include a mobile device, e.g., a Smartphone, a mobile computer, and the like.

In one example, both devices 102 and 140 may include mobile devices. For example, device 102 may include a Smartphone, and/or device 140 may include a notebook.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, or any other frequency band.

In some demonstrative embodiments, devices 102 and 140 may include one or more radios to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include modulation elements, demodulation elements, amplifiers, analog to digital converters, digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a Wi-Fi network.

In some demonstrative embodiments, wireless communication medium 103 may include a direct link, e.g., a P2P link, for example, to enable direct communication between device 102 and device 140.

In some demonstrative embodiments, wireless communication devices 102 and/or 140 may perform the functionality of Wi-Fi P2P devices. For example, device 102 may perform the functionality of a P2P client device, and/or device 140 may perform the functionality of a P2P group owner (GO) device.

In some demonstrative embodiments, wireless communication devices 102 and/or 140 may form, or communicate as part of, a Wi-Fi direct services (WFDS) network.

For example, device 140 may perform the functionality of a service advertiser and/or a service publisher, e.g., with respect to a first service, and/or device 102 may perform the functionality of a service seeker and/or service subscriber, e.g., with respect to the first service. Additionally or alternatively, device 102 may perform the functionality of a service advertiser and/or a service publisher, e.g., with respect to a second service, and/or device 140 may perform the functionality of a service seeker and/or service subscriber, e.g., with respect to the second service.

In some demonstrative embodiments, wireless communication devices 102 and/or 140 may form, or may communicate as part of, a Wi-Fi Neighbor Awareness Networking (NAN) network.

In some demonstrative embodiments, wireless communication devices 102 and/or 140 may form, or may communicate as part of, an IoT network.

In other embodiments, wireless communication devices 102 and/or 140 may form, or may communicate as part of, any other network.

In some demonstrative embodiments, devices 102 and/or 140 may include NAN devices, which may share a common set of NAN parameters, e.g., including a common time period between consecutive discovery windows, e.g., as described below.

In some demonstrative embodiments, devices 102 and/or 140 may be capable of performing the functionality of a NAN service advertiser and/or publisher, and/or a NAN service seeker and/or subscriber. For example, device 140 may perform the functionality of a NAN service advertiser and/or a NAN service publisher, e.g., with respect to a first service, and/or device 102 may perform the functionality of a NAN service seeker and/or a NAN service subscriber, e.g., with respect to the first service. Additionally or alternatively, device 102 may perform the functionality of a NAN service advertiser and/or a NAN service publisher, e.g., with respect to a second service, and/or device 140 may perform the functionality of a NAN service seeker and/or a NAN service subscriber, e.g., with respect to the second service.

In some demonstrative embodiments, devices 102 and/or 140 may include one or more applications configured to provide and/or to use one or more services using the NAN network, e.g., a social application, a file sharing application, a media application, printing services, displaying services, and/or the like.

In some demonstrative embodiments, device 102 may include an application 125 to be executed by device 102.

In some demonstrative embodiments, device 140 may include an application 145 to be executed by device 140.

In one example, applications 125 and/or 145 may be configured to interact between devices 102 and 140, for example, to provide and/or to receive services between devices 102 and 140, e.g., via the NAN network.

For example, application 125 may perform the functionality of a NAN service subscriber, and application 145 may perform the functionality of a NAN service advertiser. In another example, application 145 may perform the functionality of a NAN service subscriber, and application 125 may perform the functionality of a NAN service advertiser.

In some demonstrative embodiments, applications 125 and/or 145 may use range information between devices 102 and 140, for example, to determine if devices 102 and 140 are in proximity to each other.

In one example, device 102 may include a Smartphone, and device 140 may include a notebook. According to this example, application 125 may use the range information, e.g., to connect to device 140 and/or to share content with device 140, for example, when devices 102 and 140 are in close proximity; and/or application 145 may use the range information to unlock device 140, and/or to display content from device 102 on device 140, for example, when devices 102 and 140 are in close proximity.

In some demonstrative embodiments, devices 102 and/or 140 may perform a range measurement procedure to determine the range information between devices 102 and 140.

Some demonstrative embodiments are described herein with respect to devices, e.g., devices 102 and 140, configured to perform a range measurement procedure to determine a range between the devices. However, in other embodiments, the devices may be configured to perform any other position measurement procedure to determine any other position of the devices, e.g., an angle measurement, a horizontal level measurement, a floor resolution measurement, and the like.

In some demonstrative embodiments, the range measurement procedure may include a Time of Flight (ToF) measurement procedure (also referred to as a "round time trip" (RTT) measurement procedure), e.g., as described below.

In other embodiments, the range measurement may include any other measurement procedure, e.g., a hyperbolic navigation measurement procedure, an Angle of Arrival (AOA) measurement procedure, an Angle of Departure (AOD) measurement procedure, or any other range measurement procedure.

The ToF may be defined as the overall time a signal propagates from a first station, e.g., device 102, to a second station, e.g., device 140, and back to the first station. A distance between the first and second stations may be determined based on the ToF value, for example, by dividing the ToF value by two and multiplying the result by the speed of light.

In some demonstrative embodiments, the ToF measurement procedure may include a Fine Timing Measurement (FTM) procedure.

Figure 2:
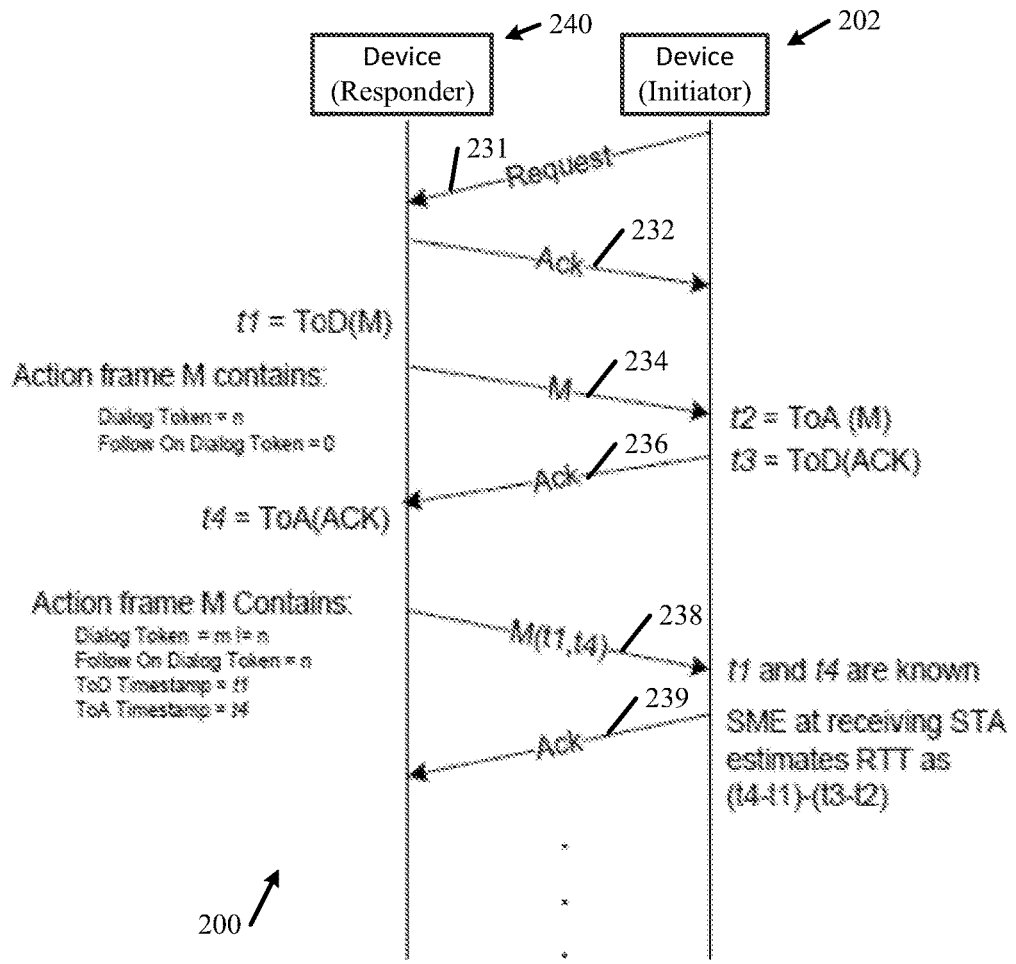
FIG. 2 is a schematic illustration of a Fine Time Measurement (FTM) procedure, in accordance with some demonstrative embodiments.

Reference is made to FIG. 2, which schematically illustrates a sequence diagram, which demonstrates operations and interactions of an FTM procedure 200 between a first wireless communication device 202 (Initiating STA) and a second wireless communication device 240 (Responding STA), in accordance with some demonstrative embodiments. For example, device 202 may perform the functionality of device 102 (FIG. 1) and/or device 240 may perform the functionality of device 140 (FIG. 1).

As shown in FIG. 2, device 202 may transmit to device 240 an FTM request message 231 to request to perform the FTM procedure 200 with device 240.

As shown in FIG. 2, device 240 may transmit an FTM request acknowledgement (ACK) 232 to device 202, to acknowledge receipt of the FTM request message 231, and to confirm the request to perform the FTM procedure.

As shown in FIG. 2, device 240 may transmit a message 234 to device 202, at a time, denoted t1. The time t1 may be a Time of Departure (ToD), denoted ToD(M), of message 234.

As shown in FIG. 2, device 202 may receive message 234 and may determine a time, denoted t2, e.g., by determining a Time of Arrival (ToA), denoted ToA(M), of message 234.

As shown in FIG. 2, device 202 may transmit a message 236 to device 240, at a time, denoted t3. Message 236 may include, for example, an acknowledgement message transmitted in response to message 234. The time t3 may be a ToD, denoted ToD(ACK), of the message 236.

As shown in FIG. 2, device 240 may receive message 236 and may determine a time, denoted t4, e.g., by determining a ToA, denoted ToA(ACK), of message 236.

As shown in FIG. 2, device 240 may transmit a message 238 to device 202. Message 238 may include, for example, information corresponding to the time t1 and/or the time t4. For example, message 238 may include a timestamp, e.g., a ToD timestamp, including the time t1, and a timestamp, e.g., a ToA timestamp, including the time t4.

As shown in FIG. 2, device 202 may receive message 238. Device 202 may determine a ToF between device 202 and device 240, for example, based on message 238.

For example, device 202 may determine the ToF based on an average, or any other function, applied to the time values t1, t2, t3 and t4. For example, device 202 may determine the ToF, e.g., as follows, or using a permutation of the following:

$$\text{ToF}=[(t4-t1)-(t3-t2)]/2 \qquad (1)$$

As shown in FIG. 2, device 202 may transmit a message 239 to device 240. Message 239 may include, for example, an acknowledgement message transmitted in response to message M(t1,t4).

In some demonstrative embodiments, device 202 may determine the distance between devices 202 and 240 based on the calculated ToF.

For example, device 202 may determine the distance, denoted $r_k$, e.g., as follows:

$$r_k=\text{ToF}*C \qquad (2)$$

wherein C denotes the radio wave propagation speed.

Referring back to FIG. 1, in some demonstrative embodiments devices 102 and/or 140 may include a controller configured to perform and/or to coordinate the range measurement procedure between devices 102 and 140. For example, device 102 may include a controller 124, and/or device 140 may include a controller 154.

In some demonstrative embodiments, controllers 124 and/or 154 may include circuitry, e.g., processor circuitry, memory circuitry, Media-Access Control (MAC) circuitry, Physical Layer (PHY) circuitry, and/or any other circuitry, configured to perform the functionality of controllers 124 and/or 154. Additionally or alternatively, one or more functionalities of the controllers 124 and/or 154 may be implemented by logic, which may be executed by a machine and/or one or more processors, e.g., as described below.

In some demonstrative embodiments, the range measurement procedure, e.g., FTM procedure 200 (FIG. 2), may have increased power consumption, and/or may increase usage of WM 103.

In some demonstrative embodiments, device 102 and/or 140 may repeat the range measurement procedure, for example, to update and/or to determine the range information.

In some demonstrative embodiments, repeating the ToF measurement procedure, e.g., a large number of times, may increase the power consumption of devices 102 and/or 104, and/or may increase usage and/or utilization of WM 103.

Some demonstrative embodiments may enable to reduce the number of range measurements, for example, to decrease the number of the ToF measurements, e.g., as described below.

In some demonstrative embodiments, devices 102 and/or 140 may select whether or not perform the range measurement procedure, for example, based on an indication of movement of one of devices 102 and 140, e.g., as described below.

In one example, selectively performing the ToF measurement procedure based on the movement of devices 102 and/or 140 may enable, for example, to avoid repetitions of unnecessary ToF measurements, e.g., when both devices 102 and 140 remain static or move a short distance.

In some demonstrative embodiments, a first device of devices 102 and 140, e.g., device 102, may communicate an indication of a movement to a second device of devices 102 and 140, e.g., device 140, for example, to enable the second device to determine whether or not to perform the ToF measurement procedure, e.g., as describe below.

In some demonstrative embodiments, device 102 may include at least one sensor 126 to detect movement of device 102, and/or device 140 may include at least one sensor 156 to detect movement of device 140.

In some demonstrative embodiments, sensors 126 and/or 156 may include a barometer, a compass, an accelerometer, a gyroscope, a Micro electro-mechanical systems (MEMS) sensor, a location determination mechanism or algorithm, and/or any other movement detector configured to detect movement.

In some demonstrative embodiments, radio 114 may communicate with radio 144 a discovery frame.

In some demonstrative embodiments, the discovery frame may include at least one movement indication field to indicate a time of movement of a sender of the discovery frame.

In some demonstrative embodiments, the time of movement of the sender of the discovery frame may include a time of a last movement of the sender before transmission of the discovery frame.

In some demonstrative embodiments, the discovery frame may include a Time Synchronization Function (TSF) value.

In some demonstrative embodiments, the TSF value may include a portion of the TSF value, for example, a partial TSF value represented by a partial number of bits of a TSF. In other embodiments, the TSF value may include the entire TSF value.

In some demonstrative embodiments, the TSF value may include a value of reference TSF, to which both devices 102 and 140 may be synchronized to.

In some demonstrative embodiments, the TSF value may include a cluster TSF value, e.g., a value of a NAN cluster TSF, of a cluster, e.g., a NAN cluster, including devices 102 and 140.

In some demonstrative embodiments, the discovery frame may include a cluster identification (ID) field to identify the cluster, e.g., a NAN cluster ID to identify the NAN cluster.

In some demonstrative embodiments, the discovery frame may include a NAN service discovery frame.

In some demonstrative embodiments, the movement indication field and/or the cluster ID field may be included in a Ranging Attribute of the NAN service discovery frame.

In some demonstrative embodiments, the cluster ID field may be included as part of the Ranging attribute of the NAN service discovery frame. In other embodiments, the cluster ID field may be included as part of any other attribute and/or Information Element (IE) of the NAN service discovery frame.

In one example, the Ranging Attribute of the NAN service discovery frame may include a field ("Last movement indication") to include a cluster TSF value at a last detected movement of the sender of the NAN service discovery frame, and a field ("Cluster ID") to include a cluster ID of a NAN cluster to which the cluster TSF refers, e.g., as follows:

TABLE 1

| Field | Size (octets) | Value | Description |
|---|---|---|---|
| Attribute ID | 1 | 0x0C | Identifies the type of NAN attribute. |
| Length | 2 | Variable | Length of the following fields in the attribute. |
| MAC Address | 6 | Variable | Device MAC address for execution of ranging protocol |
| Map Control | 1 | Variable | The availability channel and time map control information, as defined in Table 5-xx. |
| Ranging Protocol | 1 | Variable | 0: Denotes FTM (IEEE 802.11 Revmc D2.1) 1-255 Reserved |
| Last movement indication | 4 | Variable | The cluster TSF value during last detected movement of the NAN client. |
| Cluster ID | 6 | Variable | The NAN cluster ID to which the Range attribute refers to. |
| Availability Intervals Bitmap | Variable | Variable | The Availability Intervals Bitmap divides the time between the beginnings of consecutive Discovery Windows of a given NAN cluster into consecutive time intervals of equal durations. The time interval duration is specified by the Availability Interval Duration subfield of the Map Control field. A NAN device that sets the i-th bit of the Availability Intervals Bitmap to 1 shall be present during the corresponding i-th time interval in the operation channel indicated by the associated Further Availability Map attribute. A NAN device that sets the i-th bit of the Availability Intervals Bitmap to 0 may be present during the corresponding i-th time interval in the operation channel indicated by the associated Further Availability Map attribute. |

In other embodiments, the last movement indication may be included as part of any other attribute, for example, as a field, e.g., an optional field, in a service descriptor attribute (SDA).

In some demonstrative embodiments, the sender of the discovery frame may be able to provide separate indications of movements with respect to a plurality of movement types.

For example, the separate indications of movement corresponding to the plurality of movement types may enable devices 102 and/or 140 to differentiate between the different types of movement, and to take different actions with respect to the different types of movement.

In one example, devices 102 and/or 140 may be configured to select to perform the ToF measurement procedure, if a first time of movement is detected, e.g., running, or driving, and/or devices 102 and/or 140 may be configured to select not to perform the ToF measurement procedure, if a second type of movement is detected, e.g., slow walking, shaking, rotating and the like.

In some demonstrative embodiments, the at least one movement indication field of the discovery frame may include a plurality of movement indication fields corresponding to a respective plurality of movement types.

In some demonstrative embodiments, a movement indication field corresponding to a movement type may include a time of movement of the movement type, e.g., a last time of movement prior to sending the discovery frame.

In one example, the plurality of movement types may include a first movement type corresponding to walking, a second movement type corresponding to running, and/or a third movement type corresponding to driving. According to this example, a first field of the plurality of movement indication fields may indicate a last time a walking movement is detected, a second field of the plurality of movement indication fields may indicate a last time a running movement is detected, and/or a third field of the plurality of movement indication fields may indicate a last time a driving movement is detected.

For example, the Ranging Attribute of Table 1 may include a plurality of "Last indication" fields, e.g., a "Last indication Walking" field to indicate a cluster TSF value at a last detected walking movement of the sender of the NAN service discovery frame, a "Last indication Running" field to indicate a cluster TSF value at a last detected running movement of the sender of the NAN service discovery frame, a "Last indication Driving" field to indicate a cluster TSF value at a last detected driving movement of the sender of the NAN service discovery frame, and/or any other field to indicate a cluster TSF value at a last detected movement of any other type of the sender of the NAN service discovery frame.

In another example, the plurality of movement indication fields, and/or the plurality of movement types may include any other number of movement types, and/or any other movement types.

In some demonstrative embodiments, the discovery frame may include movement information corresponding to one or more parameters of the movement.

In some demonstrative embodiments, the one or more parameters may include a velocity of the movement, a direction of the movement, an acceleration of the movement, and/or an orientation of the device sending the discovery frame.

In one example, the movement information may include a direction of the movement represented with respect to a reference point.

In another example, the movement information may include a binary indication to indicate whether or not a movement occurred.

In another example, the movement information may include a location, e.g., an absolute or relative location, of the device sending the discovery frame, e.g., at the detection of the movement.

In another example, the movement information may include a movement vector representing the detected movement.

In some demonstrative embodiments, the movement information may include a sequence of movement vectors, for example, to indicate a path and/or a route of movement.

In other embodiments, the movement information may include any other information corresponding to the movement, e.g., the last detected movement, of the sender of the discovery frame.

In some demonstrative embodiments, the discovery frame may include an unsolicited publish frame 149. According to these embodiments, the sender of unsolicited publish frame 149 may include a publisher, for example, device 140, e.g., as described below.

In some demonstrative embodiments, unsolicited publish frame 149 may include a NAN discovery publish frame.

In some demonstrative embodiments, sensor 156 may detect a movement of device 140.

In some demonstrative embodiments, device 140 may transmit unsolicited publish frame 149 to device 102 including the movement indication field to indicate the last time of the detected movement of device 140.

In some demonstrative embodiments, device 102 may receive unsolicited publish frame 149.

In some demonstrative embodiments, controller 124 may determine whether or not to perform the ToF measurement procedure, e.g., based on the last time of the movement of device 140.

In some demonstrative embodiments, memory 194 and/or storage 195 may store a previous time of movement of a previous discovery frame from device 140, e.g., a previous discovery frame received prior to unsolicited publish frame 149.

In some demonstrative embodiments, controller 124 may select to perform the ToF measurement procedure with device 140, for example, if the time of movement in unsolicited publish frame 149 is later than the previous time of movement stored in memory 194 and/or storage 195.

In some demonstrative embodiments, controller 124 may select not to perform the ToF measurement procedure with device 140, for example, if the time of movement in unsolicited publish frame 149 is equal to the previous time of movement stored in memory 194 and/or storage 195, e.g., indicating that device 140 remains static.

In some demonstrative embodiments, the discovery frame may include a subscribe frame 139. According to these embodiments, the sender of subscribe frame 139 may include the subscriber, for example, device 102, e.g., as described below.

In some demonstrative embodiments, subscribe frame 139 may include a NAN subscribe frame.

In some demonstrative embodiments, sensor 126 may detect a movement of device 102.

In some demonstrative embodiments, device 102 may transmit subscribe frame 139 to device 140 including the movement indication field to indicate the last time of the movement of device 102.

In some demonstrative embodiments, device 140 may receive subscribe frame 139.

In some demonstrative embodiments, controller 154 may determine whether or not to perform the ToF measurement procedure, e.g., based on the last time of the movement of device 102.

In some demonstrative embodiments, memory 184 and/or storage 185 may store a previous time of movement of a previous discovery frame from device 102, e.g., a previous discovery frame received prior to subscribe frame 139.

In some demonstrative embodiments, controller 154 may select to perform the ToF measurement procedure with device 102, for example, if the time of movement in subscribe frame 139 is later than the previous time of movement stored in memory 184 and/or storage 185.

In some demonstrative embodiments, controller 154 may select not perform the ToF measurement procedure with device 102, for example, if the time of movement in subscribe frame 139 is equal to the previous time of movement stored in memory 184 and/or storage 185, e.g., indicating that device 102 remains static.

In some demonstrative embodiments, communicating the time of movement, e.g., in subscribe frame 139 and/or in unsolicited publish frame 149, may enable devices 102 and/or 140 to select whether or not to perform the ToF measurement procedure, for example, based on the indicated last movement of devices 102 and/or 140.

In some demonstrative embodiments, communicating the time of movement between devices 102 and 104 may enable devices 102 and/or 140 to select to avoid repeating the ToF measurement procedure, for example, if the time of movement indicates no movement or slight movement of devices 102 and/or 140.

In some demonstrative embodiments, avoiding the repeating of the ToF measurement procedure, for example, if devices 102 and 140 remain static, may reduce power consumption of devices 102 and/or 140, and/or may reduce utilization of WM 103.

Figure 3:
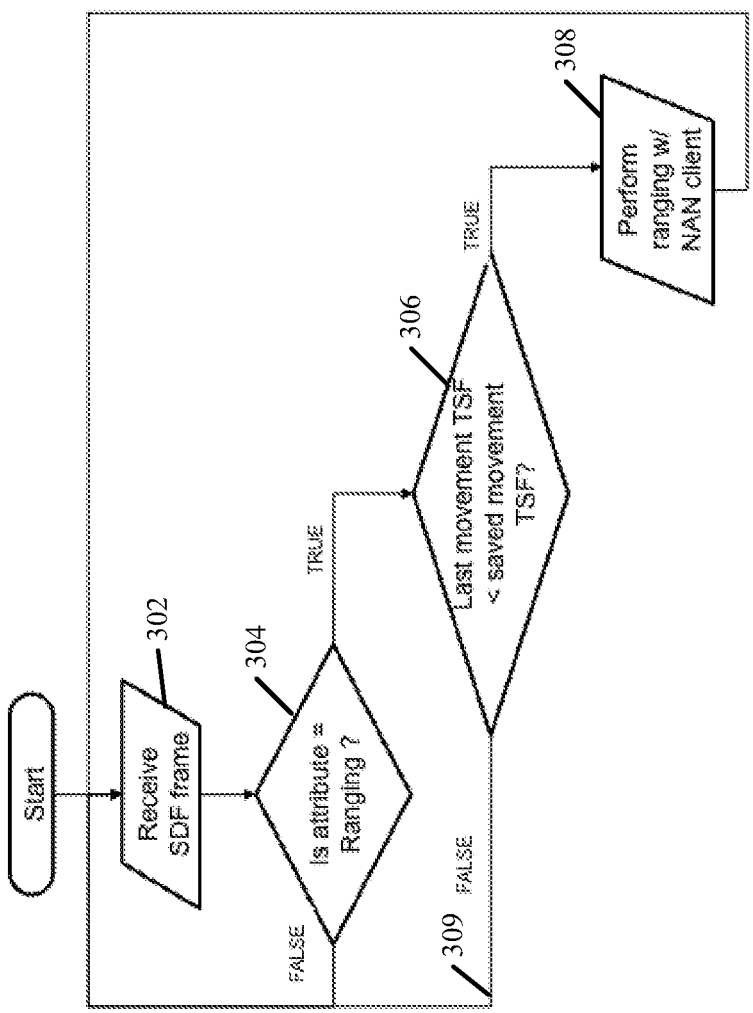
FIG. 3 is a schematic flow-chart illustration of a method of determining whether or not to perform a range measurement, in accordance with some demonstrative embodiments.

Reference is made to FIG. 3, which schematically illustrates a method of determining whether or not to perform a range measurement procedure, in accordance with some demonstrative embodiments. For example, one or more of the operations of the method of FIG. 3 may be performed by a wireless communication system, e.g., system 100 (FIG. 1); a wireless communication device, e.g., devices 102 and/or 140 (FIG. 1); a controller, e.g., controllers 124 and/or 154 (FIG. 1); a radio, e.g., radios 114 and/or 144 (FIG. 1); a transmitter, e.g., transmitters 118 and/or 148 (FIG. 1); and/or a receiver, e.g., receivers 116 and/or 146 (FIG. 1).

In one example, one or more of the operations of the method of FIG. 3 may be performed at a first wireless communication device, for example, to determine whether or not to perform a ToF measurement procedure with a second wireless communication device.

In one example, one or more of the operations of the method of FIG. 3 may be performed at device 140 (FIG. 1), for example, to determine whether or not to perform the ToF measurement procedure with device 102 (FIG. 1).

In another example, one or more of the operations of the method of FIG. 3 may be performed at device 102 (FIG. 1), to determine whether or not to perform the ToF measurement procedure with device 140 (FIG. 1).

As indicated at block 302, the method may include receiving a service discovery frame (SDF). In one example, device 102 (FIG. 1) may receive unsolicited publish frame 149 (FIG. 1), e.g., as described above. In another example, device 140 (FIG. 1) may receive subscribe frame 139 (FIG. 1), e.g., as described above.

As indicated at block 304, the method may include determining whether or not the service discovery frame includes a Ranging Attribute. For example, controller 124 (FIG. 1) may determine whether or not unsolicited publish frame 149 (FIG. 1) includes the Ranging Attribute, and/or controller 154 (FIG. 1) may determine whether or not subscribe frame 139 (FIG. 1) includes the Ranging Attribute, e.g., as described above.

As indicated at block 306, the method may include determining whether or not a time of movement indicated by the discovery frame is later than a stored time of movement, e.g., if the service discovery frame includes the Ranging Attribute. In one example, controller 124 (FIG. 1) may determine whether or not the time of movement indicated in unsolicited publish frame 149 (FIG. 1) is later than the previous time of movement stored in memory 194 and/or storage 195 (FIG. 1), e.g., as described above. In another example, controller 154 (FIG. 1) may determine whether or not the time of movement indicated in subscribe frame 139 (FIG. 1) is later than the previous time of movement stored in memory 184 and/or storage 185 (FIG. 1), e.g., as described above.

As indicated at block 308, the method may include selecting to perform the ToF measurement with the second wireless communication device, e.g., if the time of movement in the discovery frame is later than a stored time of movement. For example, controller 124 (FIG. 1) may select to perform the ToF measurement procedure with device 140 (FIG. 1), for example, if the time of movement indicated in unsolicited publish frame 149 (FIG. 1) is later than the previous time of movement stored in memory 194 and/or storage 195 (FIG. 1), e.g., as described above. In another example, controller 154 (FIG. 1) may select to perform the ToF measurement procedure with device 102 (FIG. 1), for example, if the time of movement indicated in subscribe frame 139 (FIG. 1) is later than the previous time of movement stored in memory 184 and/or storage 185 (FIG. 1), e.g., as described above.

As indicated by arrow 309, the method may include selecting not to perform the ToF measurement with the second wireless communication device, e.g., if the time of movement in the discovery frame is equal to the stored time of movement. For example, controller 124 (FIG. 1) may select not to perform the ToF measurement procedure with device 140 (FIG. 1), for example, if the time of movement in unsolicited publish frame 149 (FIG. 1) is equal to the previous time of movement stored in memory 194 and/or storage 195 (FIG. 1), e.g., as described above. In another example, controller 154 (FIG. 1) may select not to perform the ToF measurement procedure with device 102 (FIG. 1), for example, if the time of movement in subscribe frame 139 (FIG. 1) is equal to the previous time of movement stored in memory 184 and/or storage 185 (FIG. 1), e.g., as described above.

Figure 4:
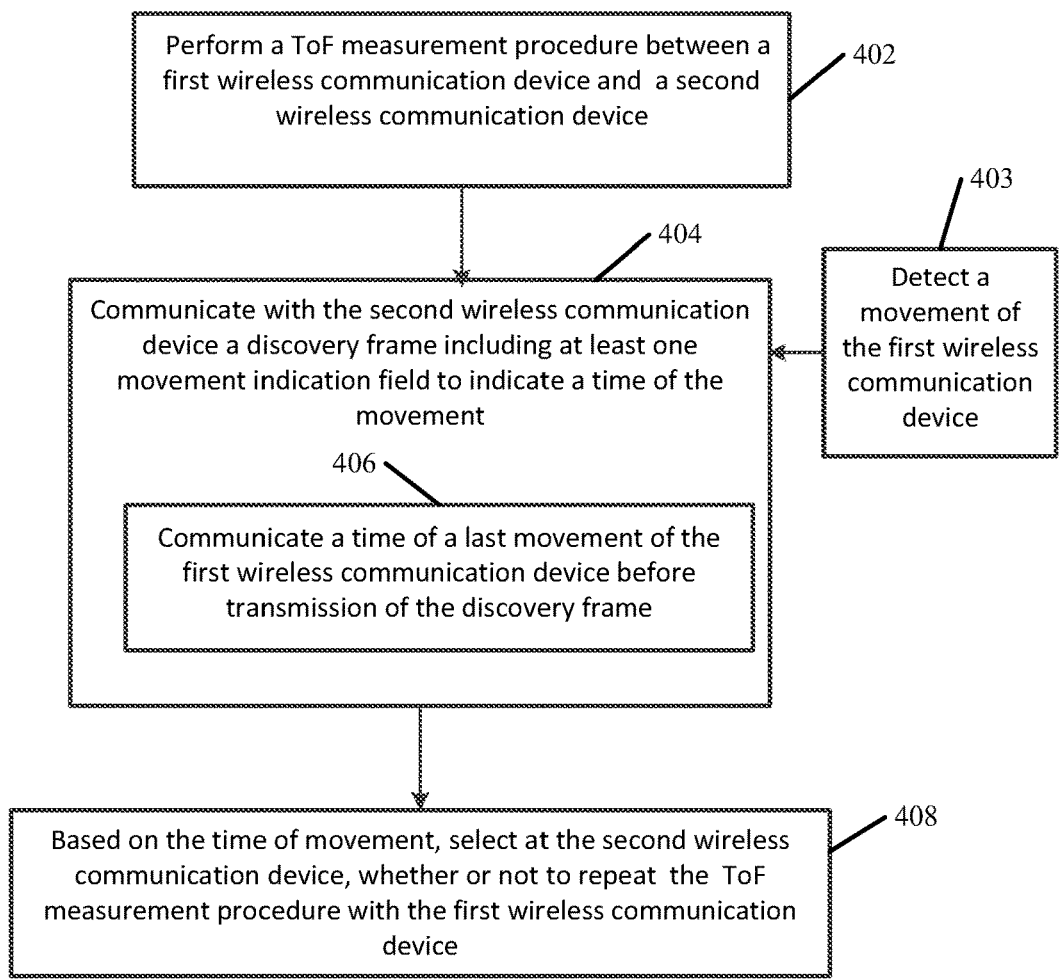
FIG. 4 is a schematic flow-chart illustration of a method of performing a range measurement, in accordance with some demonstrative embodiments.

Reference is made to FIG. 4, which schematically illustrates a method of performing a range measurement, in accordance with some demonstrative embodiments. For example, one or more of the operations of the method of FIG. 4 may be performed by a wireless communication system, e.g., system 100 (FIG. 1); a wireless communication device, e.g., devices 102 and/or 140 (FIG. 1); a controller, e.g., controllers 124 and/or 154 (FIG. 1); a radio, e.g., radios 114 and/or 144 (FIG. 1); a transmitter, e.g., transmitters 118 and/or 148 (FIG. 1); a receiver, e.g., receivers 116 and/or 146 (FIG. 1) and/or a sensor, e.g., sensors 126 and/or 156 (FIG. 1).

As indicated in block 402, the method may include performing a range measurement procedure between a first wireless communication device and a second wireless communication device. For example, controllers 124 and 154 (FIG. 1) may perform the ToF measurement between devices 102 and 140 (FIG. 1), e.g., as described above.

As indicated in block 403, the method may include detecting a movement of the first wireless communication device. For example, sensor 126 (FIG. 1) may detect movement of device 102 (FIG. 1), and/or sensor 156 (FIG. 1) may detect movement of device 140 (FIG. 1) e.g., as described above.

As indicated at block 404, the method may include communicating a discovery frame with a second wireless communication device, the discovery frame including at least one movement indication field to indicate a time of the movement. For example, radio 124 (FIG. 1) may transmit subscribe frame 139 (FIG. 1) to device 140 (FIG. 1) including the at least one movement indication field to indicate the time of movement of device 102 (FIG. 1), and/or radio 144 (FIG. 1) may transmit unsolicited publish frame 149 (FIG. 1) to device 102 (FIG. 1) including the at least one movement indication field to indicate the time of movement of device 140 (FIG. 1), e.g., as described above.

As indicated at block 406, communicating the discovery frame with the second wireless communication device may include communicating a time of a last movement of the first wireless communication device before transmission of the discovery frame. For example, radio 124 (FIG. 1) may transmit subscribe frame 139 (FIG. 1) including the time of the last detected movement of device 102 (FIG. 1), e.g., prior to transmitting frame 139 (FIG. 1); and/or device 140 (FIG. 1) may transmit unsolicited publish frame 149 (FIG. 1) including the time of the last detected movement of device 140 (FIG. 1), e.g., prior to transmitting frame 149 (FIG. 1), e.g., as described above.

As indicated at block 408, the method may include selecting, at the second wireless communication device, whether or not to perform the ToF measurement procedure with the first wireless communication device based on the time of movement in the discovery frame. For example, controller 124 (FIG. 1) may select whether or not to perform the ToF measurement procedure with device 140 (FIG. 1), e.g., based on the time of movement of device 140 (FIG. 1), and/or controller 154 (FIG. 1) may select whether or not to perform the ToF measurement procedure with device 102 (FIG. 1), e.g., based on the time of movement of device 102 (FIG. 1), e.g., as described above.

Figure 5:
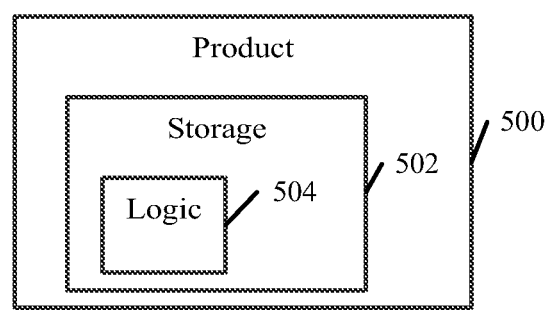
FIG. 5 is a schematic illustration of a product, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of devices 102 and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), sensors 126 and/or 156 (FIG. 1) and/or to perform one or more operations of the methods of FIGS. 3 and/or 4. The phrase "non-transitory machine-readable medium" is directed to include all computer-readable media, with the sole exception being a transitory propagating signal.

In some demonstrative embodiments, product 500 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

EXAMPLES

The following examples pertain to further embodiments.

Example 1 includes a first wireless communication device comprising a radio to communicate a discovery frame with a second wireless communication device, the discovery frame including at least one movement indication field to indicate a time of movement of a sender of the discovery frame; and a controller to perform a range measurement procedure with the second wireless communication device.

Example 2 includes the subject matter of Example 1, and optionally, wherein the time of movement comprises a time of a last movement of the sender before transmission of the discovery frame.

Example 3 includes the subject matter of Example 1 or 2, and optionally, wherein the movement indication field includes a Time Synchronization Function (TSF) value.

Example 4 includes the subject matter of Example 3, and optionally, wherein the TSF value includes a cluster TSF value of a cluster including the first and second wireless communication devices.

Example 5 includes the subject matter of Example 4, and optionally, wherein the discovery frame includes a cluster identification (ID) field to identify the cluster.

Example 6 includes the subject matter of any one of Examples 1-5, and optionally, wherein the at least one movement indication field includes a plurality of movement indication fields corresponding to a respective plurality of movement types, a movement indication field corresponding to a movement type including a time of movement of the movement type.

Example 7 includes the subject matter of any one of Examples 1-6, and optionally, wherein the discovery frame includes movement information corresponding to one or more parameters of the movement.

Example 8 includes the subject matter of Example 7, and optionally, wherein the one or more parameters comprise at least one parameter selected from the group consisting of a velocity of the movement, a direction of the movement, an acceleration of the movement, and an orientation of the sender.

Example 9 includes the subject matter of Example 7 or 8, and optionally, wherein the movement information comprises a sequence of movement vectors.

Example 10 includes the subject matter of any one of Examples 1-9, and optionally, wherein the radio is to transmit the discovery frame.

Example 11 includes the subject matter of Example 10, and optionally, comprising at least one sensor to detect the movement.

Example 12 includes the subject matter of any one of Examples 1-9, and optionally, wherein the radio is to receive the discovery frame.

Example 13 includes the subject matter of Example 12, and optionally, wherein the controller is to select whether or not to perform the range measurement procedure, based on the time of movement.

Example 14 includes the subject matter of Example 13, and optionally, comprising a memory to store a previous time of movement of a previous discovery frame, the controller is to select to perform the range measurement procedure, if the time of movement is later than the previous time of movement.

Example 15 includes the subject matter of any one of Examples 1-14, and optionally, wherein the discovery frame is an unsolicited publish frame, the sender including a service publisher.

Example 16 includes the subject matter of any one of Examples 1-14, and optionally, wherein the discovery frame is a subscribe frame, the sender including an unsolicited service subscriber.

Example 17 includes the subject matter of any one of Examples 1-16, and optionally, wherein the discovery frame is a Neighbor Awareness Networking (NAN) service discovery frame.

Example 18 includes the subject matter of Example 17, and optionally, wherein the NAN service discovery frame includes a Ranging Attribute including the movement indication field.

Example 19 includes the subject matter of any one of Examples 1-18, and optionally, wherein the range measurement procedure comprises a Time of Flight (ToF) measurement procedure.

Example 20 includes the subject matter of Example 19, and optionally, wherein the ToF measurement procedure comprises a Fine Timing Measurement (FTM) procedure.

Example 21 includes the subject matter of any one of Examples 1-20, and optionally, comprising:
one or more antennas; and
a processor;

Example 22 includes a system of wireless communication comprising a first wireless communication device including one or more antennas; a memory; a processor; a radio to communicate a discovery frame with a second wireless communication device, the discovery frame including at least one movement indication field to indicate a time of movement of a sender of the discovery frame; and a controller to perform a range measurement procedure with the second wireless communication device.

Example 23 includes the subject matter of Example 22, and optionally, wherein the time of movement comprises a time of a last movement of the sender before transmission of the discovery frame.

Example 24 includes the subject matter of Example 22 or 23, and optionally, wherein the movement indication field includes a Time Synchronization Function (TSF) value.

Example 25 includes the subject matter of Example 24, and optionally, wherein the TSF value includes a cluster TSF value of a cluster including the first and second wireless communication devices.

Example 26 includes the subject matter of Example 25, and optionally, wherein the discovery frame includes a cluster identification (ID) field to identify the cluster.

Example 27 includes the subject matter of any one of Examples 22-26, and optionally, wherein the at least one movement indication field includes a plurality of movement indication fields corresponding to a respective plurality of movement types, a movement indication field corresponding to a movement type including a time of movement of the movement type.

Example 28 includes the subject matter of any one of Examples 22-27, and optionally, wherein the discovery frame includes movement information corresponding to one or more parameters of the movement.

Example 29 includes the subject matter of Example 28, and optionally, wherein the one or more parameters comprise at least one parameter selected from the group consisting of a velocity of the movement, a direction of the movement, an acceleration of the movement, and an orientation of the sender.

Example 30 includes the subject matter of Example 28 or 29, and optionally, wherein the movement information comprises a sequence of movement vectors.

Example 31 includes the subject matter of any one of Examples 22-30, and optionally, wherein the radio is to transmit the discovery frame.

Example 32 includes the subject matter of Example 31, and optionally, comprising at least one sensor to detect the movement.

Example 33 includes the subject matter of any one of Examples 22-30, and optionally, wherein the radio is to receive the discovery frame.

Example 34 includes the subject matter of Example 33, and optionally, wherein the controller is to select whether or not to perform the range measurement procedure, based on the time of movement.

Example 35 includes the subject matter of Example 34, and optionally, comprising a memory to store a previous time of movement of a previous discovery frame, the controller is to select to perform the range measurement procedure, if the time of movement is later than the previous time of movement.

Example 36 includes the subject matter of any one of Examples 22-35, and optionally, wherein the discovery frame is an unsolicited publish frame, the sender including a service publisher.

Example 37 includes the subject matter of any one of Examples 22-35, and optionally, wherein the discovery frame is a subscribe frame, the sender including an unsolicited service subscriber.

Example 38 includes the subject matter of any one of Examples 22-37, and optionally, wherein the discovery frame is a Neighbor Awareness Networking (NAN) service discovery frame.

Example 39 includes the subject matter of Example 38, and optionally, wherein the NAN service discovery frame includes a Ranging Attribute including the movement indication field.

Example 40 includes the subject matter of any one of Examples 22-39, and optionally, wherein the range measurement procedure comprises a Time of Flight (ToF) measurement procedure.

Example 41 includes the subject matter of Example 40, and optionally, wherein the ToF measurement procedure comprises a Fine Timing Measurement (FTM) procedure.

Example 42 includes a method to be performed by a first wireless communication device, the method comprising performing a range measurement procedure with a second wireless communication device; and communicating a discovery frame with the second wireless communication device, the discovery frame including at least one movement indication field to indicate a time of movement of a sender of the discovery frame.

Example 43 includes the subject matter of Example 42, and optionally, wherein the time of movement comprises a time of a last movement of the sender before transmission of the discovery frame.

Example 44 includes the subject matter of Example 42 or 43, and optionally, wherein the movement indication field includes a Time Synchronization Function (TSF) value.

Example 45 includes the subject matter of Example 44, and optionally, wherein the TSF value includes a cluster TSF value of a cluster including the first and second wireless communication devices.

Example 46 includes the subject matter of Example 45, and optionally, wherein the discovery frame includes a cluster identification (ID) field to identify the cluster.

Example 47 includes the subject matter of any one of Examples 42-46, and optionally, wherein the at least one movement indication field includes a plurality of movement indication fields corresponding to a respective plurality of movement types, a movement indication field corresponding to a movement type including a time of movement of the movement type.

Example 48 includes the subject matter of any one of Examples 42-47, and optionally, wherein the discovery frame includes movement information corresponding to one or more parameters of the movement.

Example 49 includes the subject matter of Example 48, and optionally, wherein the one or more parameters comprise at least one parameter selected from the group consisting of a velocity of the movement, a direction of the movement, an acceleration of the movement, and an orientation of the sender.

Example 50 includes the subject matter of Example 48 or 49, and optionally, wherein the movement information comprises a sequence of movement vectors.

Example 51 includes the subject matter of any one of Examples 42-50, and optionally, comprising transmitting the discovery frame.

Example 52 includes the subject matter of Example 51, and optionally, comprising detecting the movement.

Example 53 includes the subject matter of any one of Examples 42-50, and optionally, comprising receiving the discovery frame.

Example 54 includes the subject matter of Example 53, and optionally, comprising selecting whether or not to repeat the range measurement procedure based on the time of movement.

Example 55 includes the subject matter of Example 54, and optionally, comprising storing a previous time of movement of a previous discovery frame, and selecting to perform the range measurement procedure, if the time of movement is later than the previous time of movement.

Example 56 includes the subject matter of any one of Examples 42-55, and optionally, wherein the discovery frame is an unsolicited publish frame, the sender including a service publisher.

Example 57 includes the subject matter of any one of Examples 42-55, and optionally, wherein the discovery frame is a subscribe frame, the sender including a service subscriber.

Example 58 includes the subject matter of any one of Examples 42-57, and optionally, wherein the discovery frame is a Neighbor Awareness Networking (NAN) service discovery frame.

Example 59 includes the subject matter of Example 58, and optionally, wherein the movement indication field is included in a ranging attribute of the NAN service discovery frame.

Example 60 includes the subject matter of any one of Examples 42-59, and optionally, wherein the range measurement procedure comprises a Time of Flight (ToF) measurement procedure.

Example 61 includes the subject matter of Example 60, and optionally, wherein the ToF measurement procedure comprises a Fine Timing Measurement (FTM) procedure.

Example 62 includes a product including one or more tangible computer-readable non-transitory storage media comprising computer-executable instructions operable to, when executed by at least one computer processor, enable the at least one computer processor to implement a method at a first wireless communication device, the method comprising performing a range measurement procedure with a second wireless communication device; and communicating a discovery frame with the second wireless communication device, the discovery frame including at least one movement indication field to indicate a time of movement of a sender of the discovery frame.

Example 63 includes the subject matter of Example 62, and optionally, wherein the time of movement comprises a time of a last movement of the sender before transmission of the discovery frame.

Example 64 includes the subject matter of Example 62 or 63, and optionally, wherein the movement indication field includes a Time Synchronization Function (TSF) value.

Example 65 includes the subject matter of Example 64, and optionally, wherein the TSF value includes a cluster TSF value of a cluster including the first and second wireless communication devices.

Example 66 includes the subject matter of Example 65, and optionally, wherein the discovery frame includes a cluster identification (ID) field to identify the cluster.

Example 67 includes the subject matter of any one of Examples 62-66, and optionally, wherein the at least one movement indication field includes a plurality of movement indication fields corresponding to a respective plurality of movement types, a movement indication field corresponding to a movement type including a time of movement of the movement type.

Example 68 includes the subject matter of any one of Examples 62-67, and optionally, wherein the discovery frame includes movement information corresponding to one or more parameters of the movement.

Example 69 includes the subject matter of Example 68, and optionally, wherein the one or more parameters comprise at least one parameter selected from the group consisting of a velocity of the movement, a direction of the movement, an acceleration of the movement, and an orientation of the sender.

Example 70 includes the subject matter of Example 68 or 69, and optionally, wherein the movement information comprises a sequence of movement vectors.

Example 71 includes the subject matter of any one of Examples 62-70, and optionally, wherein the method comprises transmitting the discovery frame.

Example 72 includes the subject matter of Example 71, and optionally, wherein the method comprises detecting the movement.

Example 73 includes the subject matter of any one of Examples 62-70, and optionally, wherein the method comprises receiving the discovery frame.

Example 74 includes the subject matter of Example 73, and optionally, wherein the method comprises selecting whether or not to repeat the range measurement procedure based on the time of movement.

Example 75 includes the subject matter of Example 74, and optionally, wherein the method comprises storing a previous time of movement of a previous discovery frame, and selecting to perform the range measurement procedure, if the time of movement is later than the previous time of movement.

Example 76 includes the subject matter of any one of Examples 62-75, and optionally, wherein the discovery frame is an unsolicited publish frame, the sender including a service publisher.

Example 77 includes the subject matter of any one of Examples 62-75, and optionally, wherein the discovery frame is a subscribe frame, the sender including a service subscriber.

Example 78 includes the subject matter of any one of Examples 62-77, and optionally, wherein the discovery frame is a Neighbor Awareness Networking (NAN) service discovery frame.

Example 79 includes the subject matter of Example 78, and optionally, wherein the movement indication field is included in a ranging attribute of the NAN service discovery frame.

Example 80 includes the subject matter of any one of Examples 62-79, and optionally, wherein the range measurement procedure comprises a Time of Flight (ToF) measurement procedure.

Example 81 includes the subject matter of Example 80, and optionally, wherein the ToF measurement procedure comprises a Fine Timing Measurement (FTM) procedure.

Example 82 includes a first wireless communication device comprising means for performing a range measurement procedure with a second wireless communication device; and means for communicating a discovery frame with the second wireless communication device, the discovery frame including at least one movement indication field to indicate a time of movement of a sender of the discovery frame.

Example 83 includes the subject matter of Example 82, and optionally, wherein the time of movement comprises a time of a last movement of the sender before transmission of the discovery frame.

Example 84 includes the subject matter of Example 82 or 83, and optionally, wherein the movement indication field includes a Time Synchronization Function (TSF) value.

Example 85 includes the subject matter of Example 84, and optionally, wherein the TSF value includes a cluster TSF value of a cluster including the first and second wireless communication devices.

Example 86 includes the subject matter of Example 85, and optionally, wherein the discovery frame includes a cluster identification (ID) field to identify the cluster.

Example 87 includes the subject matter of any one of Examples 82-86, and optionally, wherein the at least one movement indication field includes a plurality of movement indication fields corresponding to a respective plurality of movement types, a movement indication field corresponding to a movement type including a time of movement of the movement type.

Example 88 includes the subject matter of any one of Examples 82-87, and optionally, wherein the discovery frame includes movement information corresponding to one or more parameters of the movement.

Example 89 includes the subject matter of Example 88, and optionally, wherein the one or more parameters comprise at least one parameter selected from the group consisting of a velocity of the movement, a direction of the movement, an acceleration of the movement, and an orientation of the sender.

Example 90 includes the subject matter of Example 88 or 89, and optionally, wherein the movement information comprises a sequence of movement vectors.

Example 91 includes the subject matter of any one of Examples 82-90, and optionally, comprising means for transmitting the discovery frame.

Example 92 includes the subject matter of Example 91, and optionally, comprising means for detecting the movement.

Example 93 includes the subject matter of any one of Examples 82-90, and optionally, comprising means for receiving the discovery frame.

Example 94 includes the subject matter of Example 93, and optionally, comprising means for selecting whether or not to repeat the range measurement procedure based on the time of movement.

Example 95 includes the subject matter of Example 94, and optionally, comprising means for storing a previous time of movement of a previous discovery frame, and means for selecting to perform the range measurement procedure, if the time of movement is later than the previous time of movement.

Example 96 includes the subject matter of any one of Examples 82-95, and optionally, wherein the discovery frame is an unsolicited publish frame, the sender including a service publisher.

Example 97 includes the subject matter of any one of Examples 82-95, and optionally, wherein the discovery frame is a subscribe frame, the sender including a service subscriber.

Example 98 includes the subject matter of any one of Examples 82-97, and optionally, wherein the discovery frame is a Neighbor Awareness Networking (NAN) service discovery frame.

Example 99 includes the subject matter of Example 98, and optionally, wherein the movement indication field is included in a ranging attribute of the NAN service discovery frame.

Example 100 includes the subject matter of any one of Examples 82-99, and optionally, wherein the range measurement procedure comprises a Time of Flight (ToF) measurement procedure.

Example 101 includes the subject matter of Example 100, and optionally, wherein the ToF measurement procedure comprises a Fine Timing Measurement (FTM) procedure.

Functions, operations, components and/or features described herein with reference to one or more embodiments, may be combined with, or may be utilized in combination with, one or more other functions, operations, components and/or features described herein with reference to one or more other embodiments, or vice versa.

While certain features of have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a memory, and a processor, the processor configured to cause a first Neighbor Awareness Networking (NAN) device to:
    identify a value of a cluster Time Synchronization Function (TSF) at a time of a last detected movement of the first NAN device prior to sending a NAN frame by the first NAN device;
    include the value of the cluster TSF into a last movement indication field;
    transmit the NAN frame to a second NAN device, the NAN frame comprising a ranging attribute comprising a plurality of fields, the plurality of fields comprising the last movement indication field to assist the second NAN device in a determination to perform a ranging measurement procedure with the first device; and
    communicate messages of the ranging measurement procedure with the second NAN device.

2. The apparatus of claim 1, wherein the value of the cluster TSF comprises a partial number of bits of the cluster TSF.

3. The apparatus of claim 1, wherein the cluster TSF comprises a TSF of a NAN cluster comprising the first and second NAN devices.

4. The apparatus of claim 1, wherein the ranging measurement procedure comprises a Fine Timing Measurement (FTM) procedure.

5. The apparatus of claim 1, wherein the NAN frame comprises NAN availability information.

6. The apparatus of claim 1, wherein the NAN frame comprises a NAN Service Discovery Frame (SDF).

7. The apparatus of claim 6, wherein the NAN SDF comprises a publish SDF.

8. The apparatus of claim 1 configured to cause the first NAN device to operate as a Fine Timing Measurement (FTM) initiator of an FTM procedure with the second NAN device.

9. The apparatus of claim 1 configured to cause the first NAN device to operate as a Fine Timing Measurement (FTM) responder of an FTM procedure with the second NAN device.

10. The apparatus of claim 1 comprising a Medium Access Control (MAC), and a Physical Layer (PHY).

11. The apparatus of claim 1 comprising a radio to transmit the NAN frame.

12. The apparatus of claim 11, comprising one or more antennas connected to the radio.

13. A product comprising one or more tangible computer-readable non-transitory storage media comprising computer-executable instructions operable to, when executed by at least one processor, enable the at least one processor to cause a first Neighbor Awareness Networking (NAN) device to:
    identify a value of a cluster Time Synchronization Function (TSF) at a time of a last detected movement of the first NAN device prior to sending a NAN frame by the first NAN device;
    include the value of the cluster TSF into a last movement indication field;
    transmit the NAN frame to a second NAN device, the NAN frame comprising a ranging attribute comprising a plurality of fields, the plurality of fields comprising the last movement indication field to assist the second NAN device in a determination to perform a ranging measurement procedure with the first NAN device; and
    communicate messages of the ranging measurement procedure with the second NAN device.

14. The product of claim 13, wherein the value of the cluster TSF comprises a partial number of bits of the cluster TSF.

15. The product of claim 13, wherein the cluster TSF comprises a TSF of a NAN cluster comprising the first and second NAN devices.

16. The product of claim 13, wherein the ranging measurement procedure comprises a Fine Timing Measurement (FTM) procedure.

17. The product of claim 13, wherein the NAN frame comprises NAN availability information.

18. The product of claim 13, wherein the NAN frame comprises a NAN Service Discovery Frame (SDF).

19. The product of claim 18, wherein the NAN SDF comprises a publish SDF.

20. The product of claim 13, wherein the instructions, when executed, cause the first NAN device to operate as a Fine Timing Measurement (FTM) initiator of an FTM procedure with the second NAN device.

21. The product of claim 13, wherein the instructions, when executed, cause the first NAN device to operate as a Fine Timing Measurement (FTM) responder of an FTM procedure with the second NAN device.

* * * * *